Sept. 30, 1952     N. A. THACKER ET AL     2,612,456
PROCESS FOR APPLYING AN ORNAMENTAL AND
PROTECTIVE CRACKLE COATING TO A BASE Filed July 29, 1948     3 Sheets-Sheet 1

Inventors
NED A. THACKER &
DORIS S. THRELKELD

BY Carl Beust

THEIR Attorney

Sept. 30, 1952  N. A. THACKER ET AL  2,612,456
PROCESS FOR APPLYING AN ORNAMENTAL AND
PROTECTIVE CRACKLE COATING TO A BASE
Filed July 29, 1948  3 Sheets-Sheet 2

Inventors
NED A. THACKER &
DORIS S. THRELKELD

BY Carl Beust

THEIR Attorney

Inventors
NED A. THACKER &
DORIS S. THRELKELD

BY Carl Benst.

THEIR Attorney

Patented Sept. 30, 1952

2,612,456

UNITED STATES PATENT OFFICE 2,612,456

PROCESS FOR APPLYING AN ORNAMENTAL AND PROTECTIVE CRACKLE COATING TO A BASE

Ned A. Thacker and Doris S. Threlkeld, Dayton, Ohio, assignors to The National Cash Register Company, Dayton, Ohio, a corporation of Maryland Application July 29, 1948, Serial No. 41,195

10 Claims. (Cl. 117—41)

This invention relates to ornamental crackle coatings and to a process for making them, and more particularly pertains to such coatings derived from particles of vinyl chloride-vinyl acetate copolymer material dispersed in a highly evaporable organic liquid medium which has a slight swelling action on the particles so as to form an organosol.

Such organosol dispersions are ordinarily made by use of a ball mill or grinding mill, the ingredients being worked until a stable dispersion is formed. Plasticizers, coloring matter in the form of dyes or pigments, stabilizers and the like may be added to give the coating the desired characteristics. Organosol dispersions may contain a much larger percentage of solids than solutions and it has been the practice heretofore in the use of such organosols for making continuous coatings, as distinguished from discontinuous or crackle coatings, to heat the applied coating to the fusion temperature of the particles, which drives off the dispersing medium as a vapor and fuses the remaining particles of the copolymer material so that they form a continuous film on the surface coated therewith.

This invention provides for the formation of a crackle texture in such coatings by a low temperature drying operation after application to the surface. Later a heating stage is used so that fusion of the particles takes place.

Generally a surface to which the organosol derived crackle coating is to be applied needs a preliminary continuous base coating, either left wet or allowed to dry before the crackle coating is applied, such continuous coating acting as an adherent aid, acting as a coating which makes a colored background for the cracks in the crackle coating or acting as both.

The base coating or the crackle coating may be colored or not as desired. As the vinyl chloride-vinyl acetate copolymer material is normally translucent and colorless, two superimposed colored crackle coatings may be separated by a clear intermediate coating of a continuous type derived from a solution of such copolymer material or its equivalent. Such a continuous coating may be used either as a base coating, as an intermediate coating between two crackle coatings, or as a protective coating. By use of pigments, or dyes, either opaque or transparent, in selected ones of the coatings, various color effects and visual textures may be obtained.

The preferred vinyl chloride content of the copolymer material is of the order of 95 per cent by weight, and the average molecular weight of the copolymer material should be between 200,000 and 250,000 as determined by the osmotic pressure method. This will produce a hard, wear-resistant coating which may be made flexible by plasticizers.

Therefore, it is an object of this invention to provide a novel crackle coating derived from particles of vinyl chloride-vinyl acetate copolymer material dispersed in a highly evaporable liquid medium.

Another object of the invention is to provide a process by which such a coating is made.

Another object of the invention is to provide such a coating with one or more crackle layers.

Another object of the invention is to provide a process for successfully applying such organosol derived coatings to objects having surface characteristics normally preventing adherence by means of the use of a preparatory undercoating.

A still further object of the invention is to provide such crackle coatings with a continuous coating layer either between two crackle layers or as a final outer protective coating, or with both.

With these and incidental objects in view, the invention includes certain novel features, the essential elements of which are set forth in appended claims and a preferred form or embodiment of which is described herein with reference to the accompanying drawings.

Figure 1:
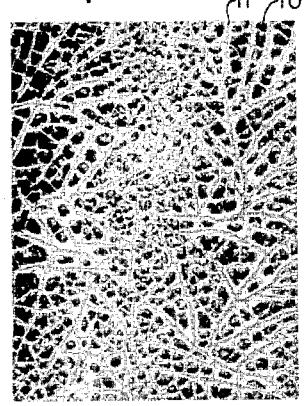
Fig. 1 shows a steel plate first given a continuous undercoating of transparent vinyl chloride-vinyl acetate copolymer material in solution and over which a transparent organosol coating is applied, dried to a crackle and fused.

After giving examples of the materials used and the preferred formulas for making crackle coatings using such materials, the various effects and surface textures shown in the drawings will be explained in more detail.

The organosol which is used to form the crackle coating is made by dispersing particles of the above specified vinyl chloride-vinyl acetate copolymer material in an easily evaporable organic suspending liquid which has a slight swelling action on the particles. This copolymer material should have a vinyl chloride content of approximately 95 per cent, by weight, the remainder being vinyl acetate. The copolymer material and other ingredients may be ground and dispersed in the suspending liquid by use of a ball mill in which the copolymer material and suspending liquid are treated together until the particle size of the copolymer material and other solids is small enough to prevent the particles from falling out of suspension before use. This resultant organosol preferably is applied to the surface to be coated by the use of a spray gun.

Following are some examples of simple organosols adapted for use as crackle coatings:

Example I

Per cent by weight

Vinyl chloride-vinyl acetate copolymer of 95% vinyl chloride content and an average molecular weight of approximately 200,000 to 250,000 as determined by the osmotic pressure method _____ 10– 50

Liquid medium consisting of a mixture of xylol by weight 28%; naptha having a boiling point range of 248°–294° Fahrenheit and a specific gravity of approximately .763 at 60° Fahrenheit, by weight 34%; and diisobutyl ketone, by weight 38% _____ 90– 50

100–100

Example II

Per cent by weight

Same copolymer material as Example I _ 10– 50
Liquid medium consisting of a mixture of xylol by weight 50–90% and diisobutyl ketone by weight 50–10% _____ 90– 50

100–100

The coatings made with Examples I and II are colorless, transparent and hard, as no coloring matter or plasticizer are used. The following formula provides a colorless, transparent and plasticized coating.

Example III

Per cent by weight

Same copolymer material as in Examples I and II _____ 50
2 ethylhexyl phthalate _____ 10
Diisobutyl ketone _____ 17
Same naptha as in Examples I and II _____ 23

100

Coatings made of the organosol of Example III are more flexible and adherent than those given in Examples I and II.

Suitable pigments may be added to the organosol, while being milled, in an amount of approximately four per cent of the combined weight of the copolymer material, liquid medium and plasticizer. Typical pigments are titanium dioxide, carbon black, lead chromate, cadmium red, chrome green, powdered aluminum and powdered bronze. Dyes soluble in the liquid dispersing medium may also be used in sufficient amounts to provide the proper depth of color. Suitable dyes for the dispersing liquids mentioned are alizarin cyanine green, methyl violet and indanthrene blue. The above list of pigments and dyes is typical only and is not to be deemed exhaustive. The coating formula may include added resins to increase the cohesiveness of the wet film so it may be applied to vertical surfaces without running or sagging. Following is a formula for an organosol with such resins added.

Example IV

Per cent by weight

Same copolymer material as in Example I ___ 30
2 ethylhexyl phthalate _____ 3
Tricresyl phosphate _____ 4
Methyl ester of abietic acid _____ 7
Phenol-formaldehyde resin having an acid number of 8–12, a melting range of 625°–650° F. and a specific gravity of 1.10–1.15 _____ 2
Xylol _____ 14
Diisobutyl ketone _____ 21
Naphtha same as used in Example I _____ 15
Pigment _____ 4

100

The pigment content may be increased, if desired, successful organosols suitable for crackle coatings having been made with a pigment content of 15 per cent.

The coating shown in Fig. 1 is applied to a steel plate having a base coat of the vinyl chloride-vinyl acetate copolymer material specified in Example I dissolved in a mixture of 40 per cent methyl isobutyl ketone, 40 per cent toluol, 10 per cent methyl-n-amyl ketone and 10 per cent xylol, by weight, there being in the solution approximately 17 per cent by weight of the copolymer material. This coating was heat stabilized by the addition of materials to be described later. The base coat was approximately .0005 of an inch thick and was baked at 350° Fahrenheit for 15 minutes. A single crackle coating was applied by spraying the organosol on to the base coat after it had cooled to room temperature. This particular organosol crackle coating had the following formula,

*Example V*

| | Per cent by weight |
|---|---|
| Same copolymer material as in Example I | 35 |
| Diisobutyl ketone | 10 |
| Xylol | 55 | and was baked at 150° Fahrenheit for approximately 10 minutes to bring about the preliminary crackle effect by drying, and then was baked in a second baking stage at 350° Fahrenheit for 15 minutes to further effect the crackle, to fuse the particles of copolymer material in each island and to cause the islands themselves to fuse to the base coat. The islands 10 (Fig. 1) show up darker than the undercoat 11 as the crackle coating formula contained no heat stabilizer. Such heat stabilizers added in quantities of between 1 and 5 per cent prevent discoloration. Among such stabilizers may be mentioned urea-formaldehyde resin and melamine-formaldehyde resin, plasticized with suitable plasticizing material such as blown castor oil or plasticizing alkyd resin.

Figure 2:
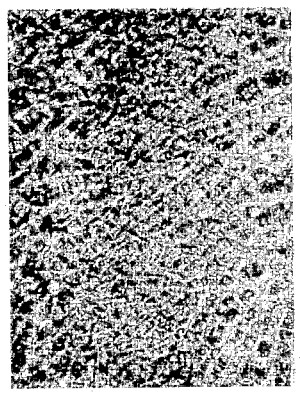
Fig. 2 shows a plate, like that of Fig. 1, except the crackle coating has received a transparent, protective overcoating which in turn is coated with a second transparent organosol coating, dried to a crackle and fused.

Fig. 2 shows the plate of Fig. 1 which has had the crackle coating covered by a protective coating of the same material as used for the base coating and, after being baked at 350° Fahrenheit for 15 minutes and cooled to room temperature, has been given a second crackle coating like the first crackle coating which second crackle coating was in turn baked at 150° Fahrenheit for 10 minutes and finally baked at 350° Fahrenheit for 15 minutes. The texture of the first crackle coating plays a part in forming the texture of the second crackle coating because it is not a plane surface, the islands being raised appreciably from the surface of the base coat. Figs. 1 and 2 show typical network textures obtained by use of a base coat of the vinyl chloride-vinyl acetate material applied as a solution baked at fusion temperature and cooled to room temperature before the crackle coat is applied.

Various effects may be gotten by combinations of base coats or base materials used in conjunction with various formulations of the crackle coating or coatings.

Figure 3:
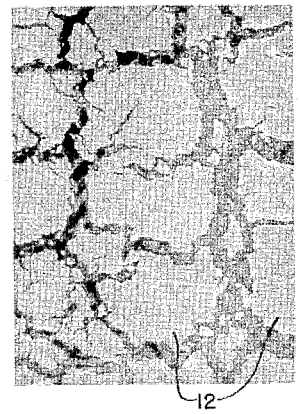
Fig. 3 shows a steel plate given a base coat of nitrocellulose lacquer which, while still wet, has a transparent vinyl copolymer organosol coating applied thereto and dried to a crackle, adherence being obtained without fusing the particles in the crackle coating.

Fig. 3 shows the effect gotten by first coating a steel plate with a nitro-cellulose lacquer which, while still wet, is given a crackle coating of the formula of Example V and heated at 150° Fahrenheit for 15 minutes. This is an example of a crackle finish whose texture is the result of a wet undercoat and the use of drying temperatures under the fusion point of the copolymer material. The particles of the large islands 12 of the copolymer material are held tightly to the base coat, although the particles in the islands themselves are not fused into a continuous film.

Figure 4:
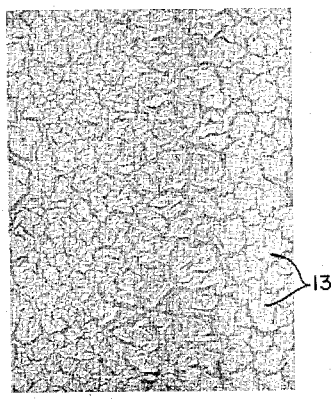
Fig. 4 shows a steel plate given a continuous base coat of acrylic resin dissolved in toluol which is dried at 150° F. and then given a transparent organosol coating also dried to a crackle at 150° F.

Fig. 4 shows a plate given a preliminary base coat of a solution of acrylic resin in toluol containing approximately 40% solids, which base coating was baked 10 minutes at 150° Fahrenheit and then given a coat of the crackle finish of Example V which was baked at 150° Fahrenheit for 10 minutes and for 5 minutes at 350° Fahrenheit.

Figure 5:
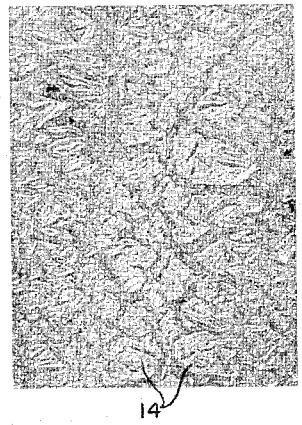
Fig. 5 shows a plate, like Fig. 4, except that the crackle coating is applied while the undercoating is still wet and both dried together at 150° F.

Fig. 5 is a coated steel plate similar to that of Fig. 4 except the crackle coat was applied while the base coat was still wet. Both coatings were baked at 150° Fahrenheit for 10 minutes and then at 350° Fahrenheit for 5 minutes. It will be noticed that the islands 13 of Fig. 4 are smaller than the islands 14 of Fig. 5, the wet base coating facilitating the agglomerating of the organosol particles into large islands.

Figure 6:
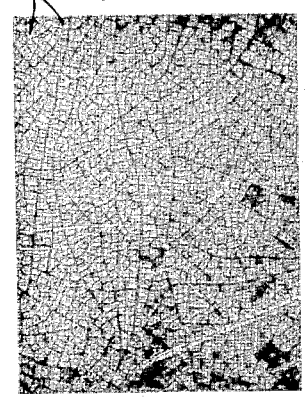
Fig. 6 shows a steel plate given a base coat of urea alkyd resin solution which is cured for one hour at 300° F. and later given an organosol coating dried to a crackle at 150° F. and fused at 350° F.

Fig. 6 shows a steel plate given an undercoating of 40% urea-formaldehyde and alkyd resin blend dissolved in butanol and xylol. The undercoating was baked for 1 hour at 300° Fahrenheit and then given a crackle coat of the formula of Example V and baked at 150° Fahrenheit for 10 minutes followed by a baking at 350° Fahrenheit for 5 minutes.

Figure 7:
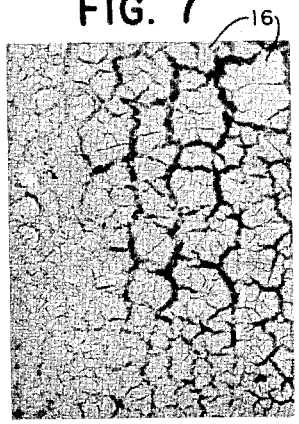
Fig. 7 is a plate, like that of Fig. 6, except the organosol coating is applied to the base coat while it is still wet and both dried together at 150° F. and later undergoing a final heating period at 350° F.

Fig. 7 shows a plate similar to that of Fig. 6 except the crackle coat was applied while the undercoat was still wet. The crackle coat was baked at 150° Fahrenheit for 10 minutes followed by a baking at 350° Fahrenheit for 5 minutes. Note that the islands 15 of Fig. 6 are much smaller than the islands 16 of Fig. 7 which were aided in forming by the wet condition of the undercoat.

Figure 8:
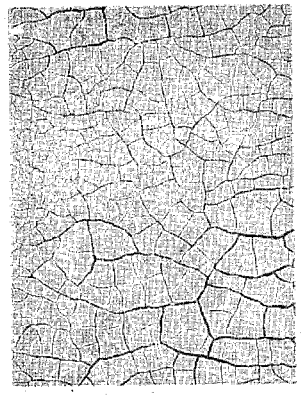
Fig. 8 shows a methyl methacrylate sheet coated with a solution of vinyl chloride-vinyl acetate copolymer material dried at 150° F., given an organosol coating dried to a crackle at 150° F.

Fig. 8 shows a methyl-methacrylate sheet coated with a solution of the vinyl chloride-vinyl acetate material such as mentioned following Example IV, baked for 10 minutes at 150° Fahrenheit and after being cooled given a coating of the organosol of Example V, baked for 10 minutes at 150° Fahrenheit. It will be understood that the particles forming the islands are not consolidated by fusion and are caused to be held on the undercoat by the slight solvent effect of the liquid dispersing medium of the organosol before it is driven off by evaporation.

All of the plates in Figs. 1 to 8, inclusive, deal with undercoats and crackle coats which fundamentally are colorless and transparent. Wet undercoats tend to increase the island size as do thicker applications of the crackle coats.

In Figs. 9 to 12, inclusive, plates are shown wherein pigments or dyes are used in the base coats, in the crackle coats, or in both, for various effects.

Figure 9:
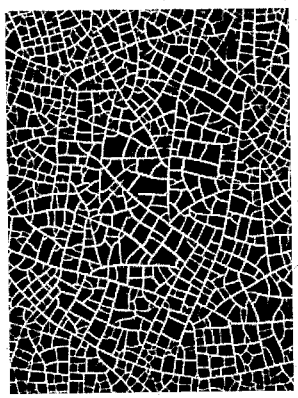
Fig. 9 shows a chromium-plated steel plate which has been given a coating of vinyl chloride-vinyl acetate copolymer material in solution which is dried and then given an organosol overcoating containing carbon black pigment, dried at 150° F. and fused at 350° F.

Fig. 9 shows a chromium plated steel plate, the surface of which has been dulled slightly, given a base coat like that given the plate of Fig. 8, said base coat being baked at 350° for 15 minutes and, after being cooled to room temperature, given a crackle coat like that of Example IV wherein the pigment is carbon black. The crackle coat was baked at 150° Fahrenheit for 10 minutes followed by a baking at 350° Fahrenheit for 15 minutes. The chromium plate shows through the cracks between the islands, giving a sharp crackle pattern effect.

Figure 10:
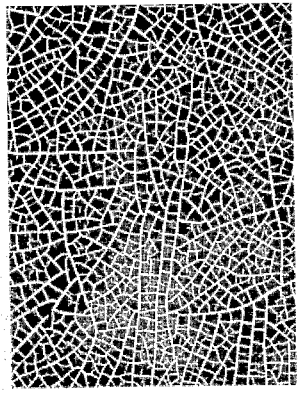
Fig. 10 shows a two-tone effect achieved with a white base coating and a crackle overcoating containing a blue dye which bleeds, somewhat, into the base coat.

Fig. 10 shows a steel plate given a white pigmented base coat of the following formula:

*Example VI*

| | Per cent by wt. |
|---|---|
| Same copolymer material as in Example I | 17 |
| Butoxy-glycol phthalate | 6 |
| Titanium dioxide | 9 |
| Lead silicate | 2 |
| Solvent consisting of 40% methylisobutyl ketone, 40% toluol, 10% methyl-n-amyl ketone and 10% xylol, by weight | 66 |
| | 100 | which was baked for 15 minutes at 350° Fahrenheit followed, when cooled to room temperature, by a crackle coat of the following formula:

*Example VII*

| | Per cent by wt. |
|---|---|
| Same copolymer material as in Example I | 27 |
| 2-ethylhexyl phthalate | 3 |
| Methyl-isobutyl ketone | 14 |
| Diisobutyl ketone | 14 |
| Xylol | 14 |
| Naphtha like used in Example I | 24 |
| Blown castor oil | 1 |
| Indanthrene blue | 3 |
| | 100 | which was baked for 10 minutes at 150° Fahrenheit and then baked for 15 minutes at 350° Fahrenheit. This gives a pattern of deep blue islands separated by light blue cracks caused by the bleeding of the dye into the white pigmented base coat, giving a novel two-tone blue effect of the same pattern as shown in Fig. 9.

Figure 11:
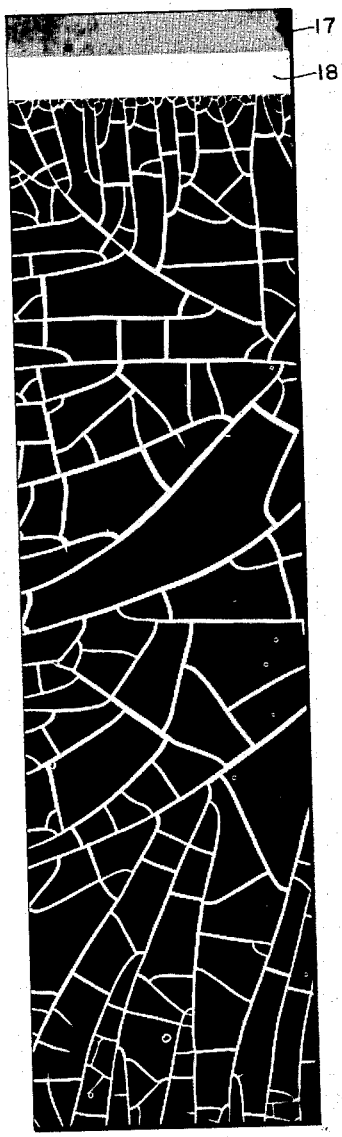
Fig. 11 shows a steel plate given a white base coat followed by a black crackle overcoat.

Fig. 11 shows a steel plate 17 given a white base coat 18, like that of Fig. 10 followed by a black crackle coat like that of Fig. 9, giving a pattern of black islands separated by white cracks. The larger islands of Fig. 11 are obtained by applying the crackle coat thicker.

Figure 12:
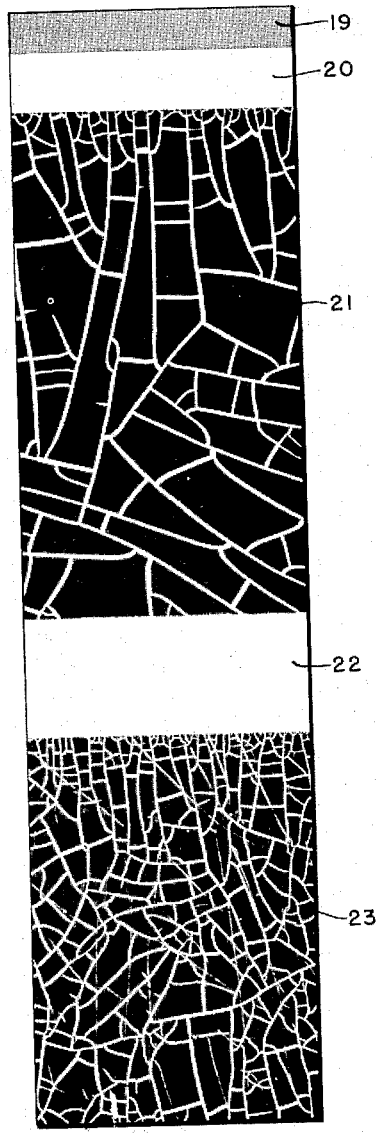
Fig. 12 shows a plate finished like that of Fig. 11 but given a protective white coating followed by a second crackle coating.

Fig. 12 shows a steel plate 19 given a white base coat 20 and a black crackle coat 21 like that of Fig. 11, followed by an intermediate white coat 22 of the same formula as coat 20 baked for 15 minutes at 350° Fahrenheit followed by a second black crackle coat 23 baked for 10 minutes at 150° Fahrenheit followed by a baking at 350° Fahrenheit for 15 minutes. Although not readily discernible, the islands of the black coat 23 have depressions therein corresponding to the white cracks of the first crackle coat lying thereunder.

Any of the above plates may be given a protective coat either colorless and transparent or colored and transparent for various artistic purposes.

It is within the scope of this invention to cause the crackle finish to form and to finally fuse it in a gradual heating operation wherein the temperature of the coating rises slowly enough to crackle before the fusion temperature is reached. Thus, articles so coated may be carried on a conveyor through an oven which causes the article coated to reach the fusion temperature only after a period of time within which the coating becomes cracked.

In applying the crackle coat by means of an air gun sprayer, a more uniform pattern can be produced by following the ordinary spray coating, after an interval of 30 seconds, with a second fine mist spray of the same material.

Although the crackle coat is preferably applied by use of a pneumatic spray gun, successful finishes may be made by applying the coat by brushing, wiping, or otherwise flowing the crackle coating onto the surface to which it is to be applied.

It is to be understood that the organosol when applied by the spray gun, or otherwise, gives a coat having a high content of solid particles as compared to a coat of a solution of the same copolymer material, and that the cracking is brought about by a drying stage which rapidly drives off the suspending liquid medium without fusing the particles.

While the product and process of making it described herein are admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. A process for making an ornamental and protective crackle coating on a surface of an object, including the steps of applying to the surface a film of an organosol composed of particles of vinyl chloride-vinyl acetate copolymer material dispersed in a volatile organic liquid medium readily evaporable below the fusion temperature of the particles and having a slight swelling effect on the surface of the particles; drying the organosol film by heat to rapidly drive off substantially all of the volatile liquid medium but at a temperature below the fusion temperature of the particles, whereby the film dries and cracks to form islands, each composed of a group of these particles; and the step of thereafter heating the cracked film to a temperature above the fusion point of the particles to fuse the particles of each island so they form a continuous film which adheres to the surface.

2. The process of claim 1 in which the surface, to be crackle coated, is given a first coating of a dryable organic liquid film forming material adherent to the surface and to which the crackle coating will adhere.

3. The process of claim 2 in which the first coating is dried before the crackle coating is applied.

4. The process of claim 1 in which the organosol contains a coloring material.

5. The process of claim 1 in which the surface to be crackle coated is given a first coating of a colored film-forming organic material adherent to the surface and to which the crackle coating is adherent.

6. The process of claim 1 in which a protective continuous coating is applied over the crackle coating.

7. The process of claim 6 in which a second crackle coating is applied over the protective coating.

8. A process for making an ornamental and protective crackle coating on a surface of an object on which vinyl chloride-vinyl acetate copolymer material will adhere when said material is heated to fusion temperature, including the steps of applying to the surface a fluid film of an organosol composed of particles of vinyl chloride-vinyl acetate copolymer material dispersed in a volatile organic liquid medium readily evaporable at a temperature below the fusion temperature of the particles and having a slight swelling effect on the particles; first drying the film by heating to a temperature sufficient to rapidly drive off substantially all of the volatile liquid medium but below the fusion point of the particles, whereby the film forms a preliminary crackle wherein the particles are grouped in a plurality of islands; and finally heating the dried film, for a period, to a temperature slightly above the fusion point of the particles whereby the particles in each island are further dried, consolidated and fused, increasing the crack widths and forming, on cooling, a solid crackle coating.

9. A process for making an ornamental and protective crackle coating from vinyl chloride-vinyl acetate copolymer material comprising approximately 95% by weight of vinyl chloride, the remainder being vinyl acetate, and having an average molecular weight of between 200,000 and 250,000 as determined by the osmotic pressure method, including the steps of applying to a surface to which said copolymer material will adhere after being brought to fusion thereon, a film of an organosol composed of fine particles of said copolymer material dispersed in a liquid organic medium having but a slight swelling effect on the particles and rapidly evaporable at temperatures below the copolymer particle fusion point; drying the film by heat at a temperature below the said fusion point but high enough to rapidly drive off substantially all of the liquid suspending medium, whereby the film cracks; and finally heating the cracked film to a point above the fusion temperature of the copolymer material until the particles in each island formed by the cracks are consolidated and in condition to become adherent to the surface upon cooling to room temperature.

10. The process of claim 9 wherein the organosol contains between 10 and 50 percent, by weight, of the copolymer material.

NED A. THACKER.
DORIS S. THRELKELD.

REFERENCES CITED

The following references are of record in the file of this patent:

UNITED STATES PATENTS

| Number | Name | Date |
|---|---|---|
| 1,547,453 | Simon | July 28, 1925 |
| 1,711,330 | Simon | Apr. 30, 1929 |

OTHER REFERENCES

Powell: "A New Technique in Coatings, Vinylite Resin Dispersions," Official Digest #263, Dec. 1946, 7 pages.